United States Patent Office 2,908,939
Patented Oct. 20, 1959

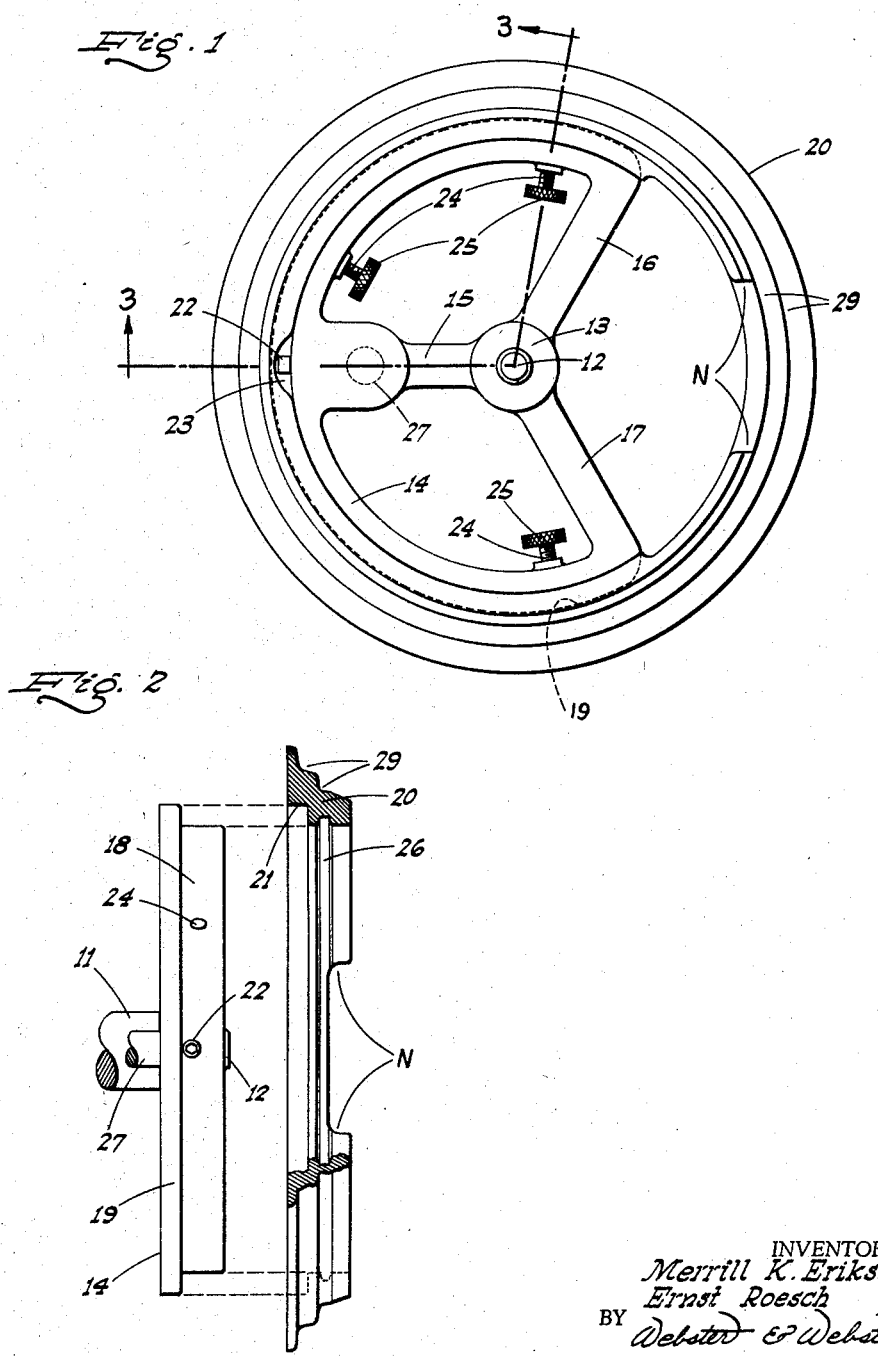

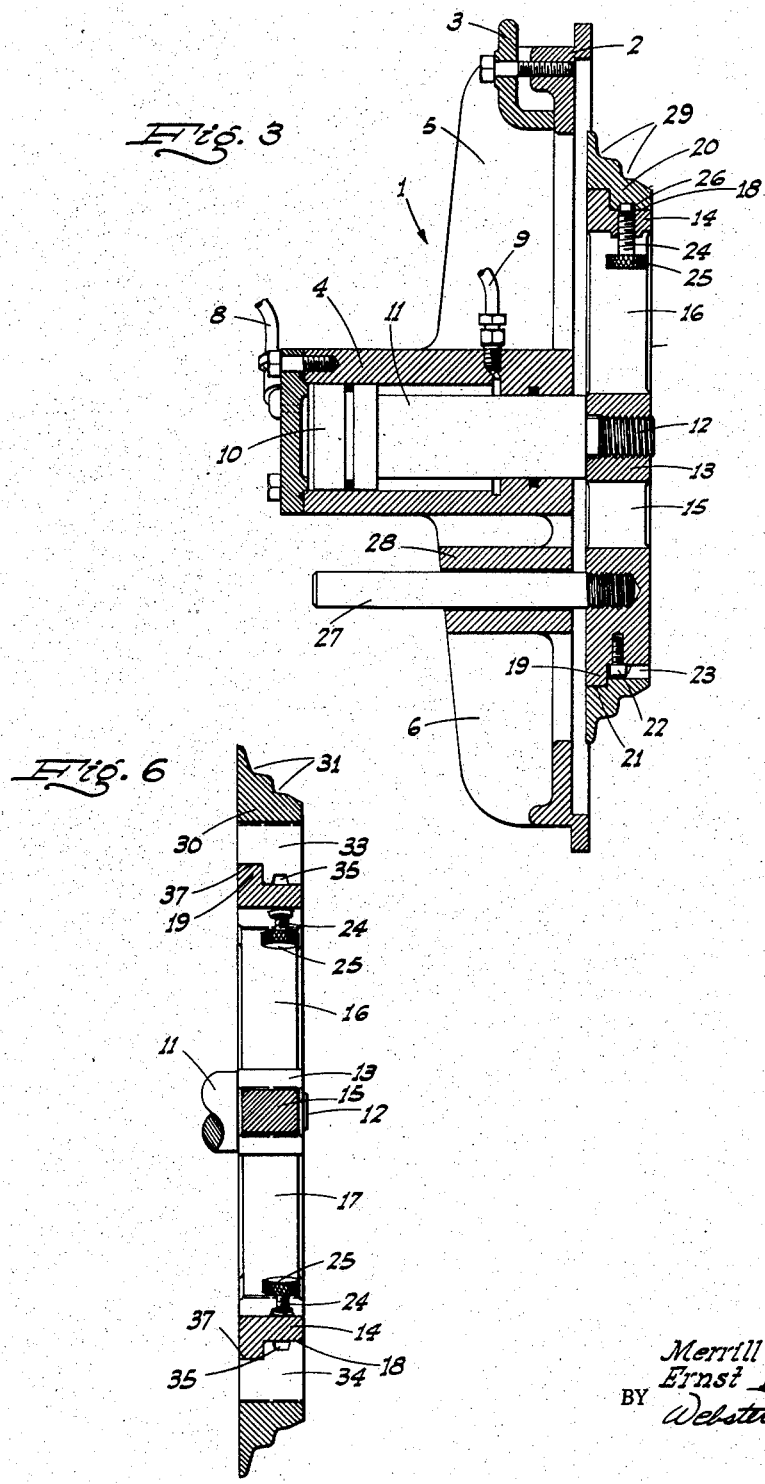

2,908,939

BEAD ENGAGING PRESSURE RING UNIT

Merrill K. Eriksen and Ernst Roesch, Lodi, Calif., assignors to Super Mold Corporation of California, a corporation of California Application April 29, 1957, Serial No. 655,714

6 Claims. (Cl. 18—18)

This invention relates in general to a tread centering device for a tire retreading mold, and wherein such device includes tire bead engaging pressure ring units mounted on opposite sides of the mold; such pressure ring units being arranged to function in a manner to yieldably resist separating movement of such beads upon inflation of an inside curing bag in the tire, and to the end that the tire is held true in the mold for vulcanization of a new and properly centered tread thereon.

The foregoing tread centering device is embraced by United States Patent No. 2,734,225, and the present invention embodies an improvement thereover.

It is the major object of this invention to provide, for a tread centering device as above, a tire bead engaging pressure ring unit which includes—on a novel mount—a pressure ring which is readily detachable, whereby to permit of the replacement of another ring of a different diameter. The advantage resides in the fact that a tread centering device with pressure ring units so constructed may be used in conjunction with the retreading of different sized tires and wherein the bead diameter varies.

Another important object of the invention is to incorporate, in an improved pressure ring unit as above, novel means for relatively quick-detachably securing a selected one of the pressure rings on the mount.

It is also an object of the invention to provide an improved pressure ring unit, for a tread centering device, which is designed for ease and economy of manufacture, and convenience of use.

An additional object of the invention is to provide a practical, reliable, and durable pressure ring unit for a tread centering device.

These objects are accomplished by means of such structure and relative arrangement of parts as will fully appear by a perusal of the following specification and claims.

In the drawings:

Fig. 1 is a front elevation of the improved pressure ring unit.

Fig. 2 is a fragmentary side elevation of the mounting ring and the pressure ring in alined but spaced apart relation; the pressure ring being partly broken away and in section.

Fig. 3 is a longitudinal sectional elevation of the complete pressure ring unit, embodying the invention and taken on line 3—3 of Fig. 1.

Fig. 6 is a diametral section showing the pressure ring of Fig. 5 as applied to the mounting ring of the unit.

Figure 4:
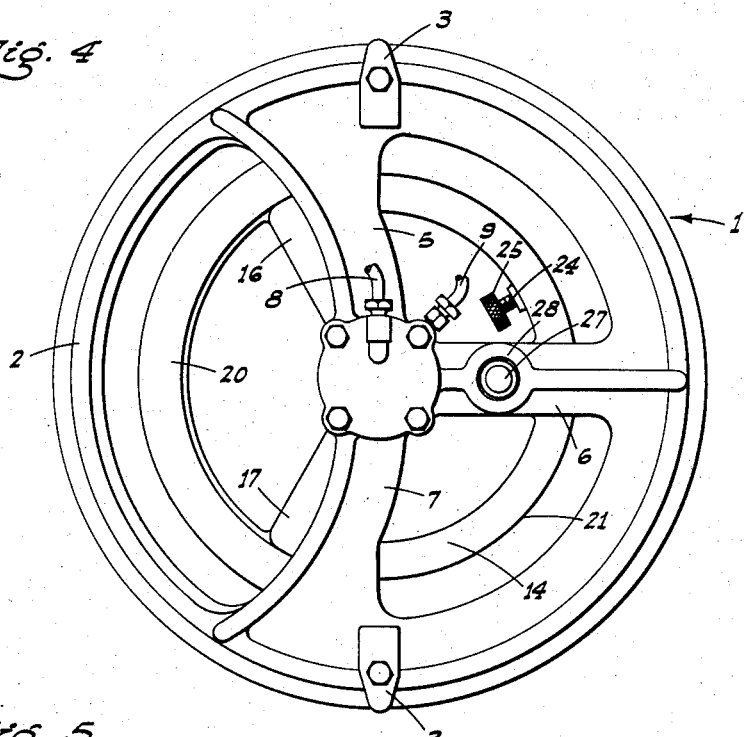
Fig. 4 is a rear end elevation of said pressure ring unit.

Referring now more particularly to the drawings and to the characters of reference marked thereon, the improved pressure ring unit—which is shown in end elevation in Figs. 1 and 4, and in longitudinal sectional elevation in Fig. 3—is indicated generally at 1. Such unit 1 comprises an attachment ring 2 by means of which the unit is secured to an annular body section (not shown) of a tire retreading mold by means of clamps 3.

A double acting, fluid pressure power cylinder 4 is rigidly suspended centrally or axially in the attachment ring 2 by means of spider arms 5, 6, and 7. The power cylinder 4 is adapted to be reversibly actuated by a valve controlled, fluid pressure supply conduit system which includes conduits 8 and 9 connected to said cylinder on opposite sides of the piston 10 which works therein. Such piston 10 is connected to a piston rod 11 which projects from the inner end of said cylinder, and at its free end said piston rod is formed with a reduced-diameter, threaded axial stud or neck 12.

The neck 12 is threaded into the central hub 13 of a concentric segmental mounting ring 14 supported in integral relation from said hub by spider arms 15, 16, and 17; arms 16 and 17 being at the ends of said segmental ring 14, as shown in Fig. 1.

The peripheral face of the mounting ring 14 is indicated at 18, and a radial stop shoulder 19 projects outwardly from such face adjacent its inner edge. Such mounting ring 14 carries thereon a tire bead engaging pressure ring 20; said pressure ring 20 bearing in matching relation on the peripheral face 18 of the mounting ring 14, and being arcuately notched, as at 21, for the reception—also in matching relation—of the radial stop shoulder 19.

The tire bead engaging pressure ring 20 is correctly positioned—circumferentially—on the mounting ring 14 by means of a locator knob 22 which projects outwardly from said peripheral face 18 and is received in a notch 23 cut in said pressure ring 20; such notch being open-ended so as to permit of unobstructed placement of the ring 20 on—or its removal from—the mounting ring 14 by movement of said ring 20 in an axial direction. The locator knob 22 is the head of a screw threaded radially into the mounting ring 14, as shown in Fig. 3.

The pressure ring 20 is formed, at the periphery and in the inner portion thereof, with an arcuate notch or recess N for the same purpose as the similar notches shown in the pressure rings of Patent No. 2,734,225. The locator knob 22 and notch 23 are positioned relative to each other so as to be opposite the notch N, or so that said notch will be disposed centrally of the relatively open space between the ends of the mounting ring 14, as shown in Fig. 1.

Since the air receiving stem of the air bag which fits into a tire supported on the opposed pressure rings 20 is also located in the zone of notch N, the supplying of air to such stem from an air hose disposed exteriorly of the mold of which the mounting ring forms a part is greatly facilitated.

The tire bead engaging pressure ring 20 is normally but releasably maintained against axial escape from the mounting ring 14 by means of a plurality of circumferentially spaced set screws 24 threaded through the mounting ring 14 from the inside; the exposed rear ends of said set screws 24 each being formed with a knurled head 25 for finger engagement. At their forward ends the set screws 24—when advanced—are received in ring-retaining relation in a related recess 26 formed in the pressure ring 20 and opening inwardly therefrom.

Thus, with the pressure ring 20 in place on the mounting ring 14, and with the set screws 24 tightened, said rings comprise a unitary assembly movable with the piston rod 11 upon actuation—in one direction or the other—of the power cylinder 4.

The above assembly of rings 14 and 20 is maintained against rotation, but without restricting axial movement thereof, by means of a guide rod 27 secured to said mounting ring 14 and extending—in offset but parallel relation to the piston rod 11—through a guide 28 integral with the spider 15.

The above described pressure ring unit is mounted on a tire retreading mold, and used in the same manner as contemplated by the aforementioned United States Letters Patent No. 2,734,225; the pressure ring 20 being annularly grooved, as at 29, for tire bead engagement.

When it is desired to use the pressure ring unit 1 with a mold-supported tire having a bead diameter other than that corresponding to the pressure ring 20, the latter is removed by the simple expedient of loosening the set screws 24 and detaching said pressure ring 20 by shifting it axially off of the mounting ring 14.

Figure 5:
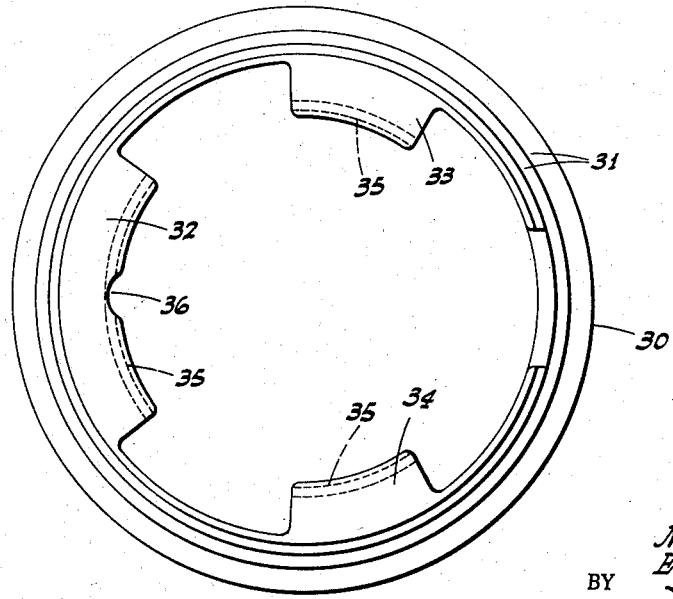
Fig. 5 is a front elevation, detached, of a pressure ring of larger diameter than shown in Figs. 1–4 inclusive.

Thereafter, a separate pressure ring, corresponding in working diameter to to the tire bead to be engaged, is replaced on said mounting ring 14. Such a separate pressure ring is shown—by way of example—in Figs. 5 and 6, being indicated at 30, and being annularly grooved—just as in the case of the ring 20—as at 31, for tire bead engagement.

The separate pressure ring 30 is here illustrated as being one which is of larger diameter than the pressure ring 20, and to accommodate said ring 30 to the mounting ring 14 the former includes—on the inside—a plurality of circumferentially spaced, part-circle lands 32, 33, and 34 which project radially inwardly, and which are arcuate at their inner ends for engagement in matching relation with the peripheral face 18 of the mounting ring 14. Each of the aforesaid lands includes a recess 35 for the reception of the related set screw 24. Also, the land 32 is notched, as at 36, for reception—in ring-locating relation—of the knob 22; said lands also being arcuately notched, as at 37, for reception of the stop shoulder 19 on mounting ring 14.

As so constructed the alternate or replacement pressure ring 30 can be readily and conveniently used on the unit 1 in substitution for the pressure ring 20.

It is to be recognized that by reason of the particular structure employed, and including the novel means for releasably securing the pressure ring 20 or 30 on the mounting ring 14, such pressure rings can be substituted—one for the other—without detaching the pressure ring unit 1 from the tire retreading mold.

While only two pressure rings are here shown, additional of said rings—corresponding to other tire sizes or bead diameters—may be provided within the scope of this invention.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent is desired:

1. In a tread centering device for a tire retreading mold, a mold supported element movable axially thereof and having an exposed end, a mounting ring secured on said end of the element for movement therewith, an initially separate pressure ring adapted for tire bead engagement, and means detachably securing the pressure ring on the mounting ring for movement as a unit therewith.

2. In a tread centering device for a tire retreading mold, a mold supported element movable axially thereof and having an exposed end, a mounting ring secured on said end of the element for movement therewith and having an outer peripheral face, an initially separate pressure ring adapted for tire bead engagement and having inner peripheral face portions to fit on the peripheral outer face of the mounting ring, means on the rings locating the pressure ring against turning movement on the mounting ring, and other means on the rings preventing axial movement of the pressure ring on the mounting ring.

3. A device, as in claim 2, in which the first named means comprises a knob projecting radially out from the peripheral face of the mounting ring; the pressure ring having a notch in its inner peripheral face portion extending parallel to the axis of the pressure ring and open at one end for the reception of the knob upon sliding movement of the pressure ring onto the mounting ring.

4. A device, as in claim 2, in which the last named means comprises a set screw threaded through the mounting ring radially thereof in position so that the outer end of said screw may engage the inner peripheral face portion of the pressure ring; said face portion being recessed to receive such outer end of the set screw.

5. In a tread centering device for a tire retreading mold, a mold supported element movable axially thereof and having an exposed end, a mounting ring secured on said end of the element for movement therewith and having an outer peripheral face formed with an arcuate stop shoulder projecting radially outward from said face at the edge thereof adjacent said element, an initially separate pressure ring adapted for tire bead engagement and having an inner peripheral face portion of a cross sectional form to matchingly engage and fit the outer peripheral face of the mounting ring upon axial movement of the pressure ring in one direction, and instrumentalities on the rings to prevent rotation of the pressure ring on the mounting ring when mounted thereon, and means to then prevent axial movement of the pressure ring in the opposite direction.

6. In a tread centering device for a tire retreading mold, a mold supported element movable axially thereof and having an exposed end, a segmental mounting ring secured on said end of the element for movement therewith, an initially separate full-circle pressure ring adapted for tire bead engagement removably fitted on the mounting ring, said pressure ring having an arcuate peripheral notch on its inner face, and cooperating locating means on the rings to maintain the pressure ring so that the notch therein is disposed substantially centrally between the ends of the segmental mounting ring.

References Cited in the file of this patent

UNITED STATES PATENTS

| | | |
|---|---|---|
| 2,659,104 | Glynn | Nov. 17, 1953 |
| 2,734,225 | Glynn | Feb. 14, 1956 |